(12) United States Patent
Isaac et al.

(10) Patent No.: US 8,585,475 B2
(45) Date of Patent: Nov. 19, 2013

(54) CROP RESIDUE DISTRIBUTION APPARATUS AND SYSTEM WITH COOPERATIVELY MOVABLE DEFLECTOR DOOR AND SPREADER ASSEMBLY

(75) Inventors: Nathan E. Isaac, Lancaster, PA (US); Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/448,834

(22) Filed: Apr. 17, 2012

(65) Prior Publication Data

US 2012/0270613 A1   Oct. 25, 2012

Related U.S. Application Data

(60) Provisional application No. 61/517,419, filed on Apr. 19, 2011.

(51) Int. Cl.
*A01F 12/30* (2006.01)

(52) U.S. Cl.
USPC .......................................... 460/111; 460/112

(58) Field of Classification Search
USPC ........... 460/111, 112; 239/657, 682, 667, 673
See application file for complete search history.

(56) References Cited

U.S. PATENT DOCUMENTS

| 4,056,107 | A |   | 11/1977 | Todd et al. |  |
|---|---|---|---|---|---|
| 4,617,942 | A | * | 10/1986 | Garner | 460/112 |
| 4,646,757 | A | * | 3/1987 | Schmitt et al. | 460/112 |
| 4,884,993 | A | * | 12/1989 | Hemker et al. | 460/14 |
| 5,021,028 | A | * | 6/1991 | Kersting et al. | 460/85 |
| 5,797,793 | A | * | 8/1998 | Matousek et al. | 460/111 |
| 5,833,533 | A |   | 11/1998 | Roberg |  |
| 6,238,286 | B1 | * | 5/2001 | Aubry et al. | 460/111 |
| 6,251,009 | B1 | * | 6/2001 | Grywacheski et al. | 460/112 |
| 6,416,405 | B1 | * | 7/2002 | Niermann | 460/79 |
| 6,547,169 | B1 |   | 4/2003 | Matousek et al. |  |
| 6,656,038 | B1 |   | 12/2003 | Persson |  |
| 6,663,485 | B2 | * | 12/2003 | Niermann | 460/79 |
| 6,685,558 | B2 | * | 2/2004 | Niermann et al. | 460/111 |
| 6,719,627 | B2 |   | 4/2004 | Wolters et al. |  |
| 6,860,805 | B2 | * | 3/2005 | Kuhn et al. | 460/111 |
| 6,863,605 | B2 | * | 3/2005 | Gryspeerdt et al. | 460/111 |
| 6,866,580 | B2 | * | 3/2005 | Weichholdt et al. | 460/112 |
| 6,881,145 | B2 |   | 4/2005 | Holmen |  |
| 6,908,379 | B2 |   | 6/2005 | Gryspeerdt et al. |  |
| 7,044,408 | B2 | * | 5/2006 | Schoenfeld | 239/659 |
| 7,044,853 | B2 |   | 5/2006 | Weichholdt |  |
| 7,063,613 | B2 | * | 6/2006 | Weichholdt | 460/112 |

(Continued)

FOREIGN PATENT DOCUMENTS

EP   0357090   3/1990

*Primary Examiner* — Árpád Fábián-Kovács
(74) *Attorney, Agent, or Firm* — Patrick M. Sheldrake

(57) ABSTRACT

The crop residue distribution apparatus and system use a horizontal crop spreader assembly and deflector door independently relatively positionable to be configurable in a straw windrowing and chaff spreading configuration in which straw flow is directed through an aperture between drive units of the spreader assembly while the chaff is directed to the spreader disposed in a lower opening; in a straw and chaff spreading configuration wherein the door closes the aperture and both straw and chaff are directed to the spreader; and in a straw and chaff windrowing configuration wherein the spreader is withdrawn from the lower opening such that the straw and chaff are both discharged therethrough to form a windrow without requiring removing disks of the spreader.

19 Claims, 13 Drawing Sheets

(56) References Cited

U.S. PATENT DOCUMENTS

| | | |
|---|---|---|
| 7,066,810 B2 * | 6/2006 | Farley et al. .................. 460/112 |
| 7,074,126 B2 * | 7/2006 | Weichholdt et al. ........... 460/112 |
| 7,455,584 B2 * | 11/2008 | Farley et al. .................. 460/111 |
| 7,559,833 B2 | 7/2009 | Isaac et al. |
| 7,635,299 B2 * | 12/2009 | Murray et al. ................. 460/111 |
| 7,648,413 B2 | 1/2010 | Duquesne et al. |
| 7,717,779 B1 | 5/2010 | Weichholdt et al. |
| 7,896,732 B2 | 3/2011 | Benes et al. |
| 8,029,347 B2 * | 10/2011 | Pohlmann et al. ............. 460/112 |
| 8,070,570 B2 * | 12/2011 | Murray et al. ................. 460/111 |
| 8,128,467 B2 * | 3/2012 | Weichholdt et al. ........... 460/112 |
| 2003/0003974 A1 * | 1/2003 | Niermann et al. ............. 460/111 |
| 2003/0114207 A1 * | 6/2003 | Wolters et al. ................ 460/111 |
| 2007/0015556 A1 * | 1/2007 | Johnson et al. ............... 460/111 |
| 2009/0042625 A1 | 2/2009 | Dow et al. |
| 2010/0184494 A1 | 7/2010 | Klein et al. |
| 2010/0267432 A1 | 10/2010 | Roberge et al. |
| 2011/0045883 A1 * | 2/2011 | Weichholdt et al. ........... 460/112 |

* cited by examiner

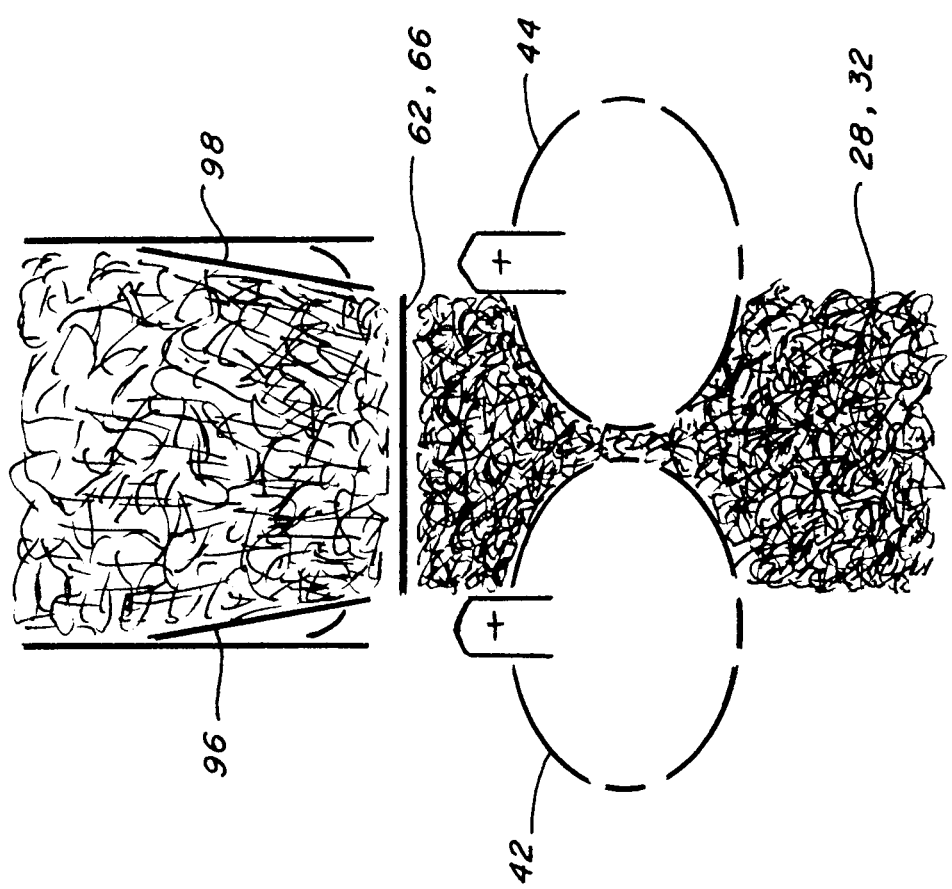

CROP RESIDUE DISTRIBUTION APPARATUS AND SYSTEM WITH COOPERATIVELY MOVABLE DEFLECTOR DOOR AND SPREADER ASSEMBLY

This application claims the benefit of U.S. Provisional Application No. 61/517,419, filed Apr. 19, 2011.

TECHNICAL FIELD

This invention relates generally to a crop residue distribution apparatus and system for an agricultural harvesting machine, and more particularly, to an apparatus and system which includes a horizontal spreader assembly and deflector door co-operably positionable alternatively in a straw windrowing and chaff spreading configuration, a straw and chaff spreading configuration, and a straw and chaff windrowing configuration, without requiring removing the spreader disks.

BACKGROUND ART

The disclosure of U.S. Provisional Application No. 61/517,419, filed Apr. 19, 2011, is hereby incorporated herein in its entirety by reference.

Agricultural combine harvesting machines or harvesters typically discharge crop residue, or processed crop material, from a rear cavity of the harvester. Crop residue is typically generated by two sources. One source is the threshing and separating system, which produces a large volume of crop residue, typically including larger fragments of stalks, stems, cobs, and leaves, often referred to as straw or straw residue. The other source is the cleaning system, which produces a much lower volume of smaller elements of crop residue, such as pod and husk fragments, and particulates, commonly referred to as chaff or chaff residue. Both sources are typically propelled rearwardly through the rear cavity of the harvesting machine, and discharged through a rear opening in some manner.

Combine harvesters or machines typically utilize a rotary residue spreader in or adjacent to the rear opening to distribute the processed crop materials or residue over a harvested field. Alternatively, the spreader can be by-passed to not spread or distribute the crop material onto the field for a subsequent operation, such as baling. When the residue spreader is by-passed, the by-passing crop residue material, is often desirably placed on the field in a relatively narrow windrow behind the harvester in a process referred to as windrowing. Later, if the windrows are to be baled, often the baling apparatus, e.g., a tractor towing a baler, will have wheels spaced a certain distance side to side apart. As one desirable advantage, the windrows will be at least marginally smaller in width than this distance, so that when baling, the tractor wheels are not driven on the windrows. Difficulty achieving desired windrow width increases proportionally as the volume of residue to be windrowed increases, as a result for instance, of larger header widths and harvesting machine capacity, crop cut heights, crop density, etc. As another advantage, in some circumstances, it may be desired to windrow all of the crop residue for later pick up, e.g., baling, and in other circumstances it may be desired to have the ability to spread some of the residue, particularly the lighter, smaller chaff, and to bale the larger straw.

Rotary residue spreaders typically include counter rotating disks or impellers for receiving all or part of the processed crop material or residue from the rear cavity of a combine harvester and spreading the material in a generally even side to side manner behind the harvester. In some styles of spreaders, known generally as vertical spreaders, the impellers are oriented generally vertically or at a small acute angle relative to vertical, so as to rotate about a horizontal or near horizontal rotational axis. In other spreaders, known generally as horizontal spreaders, the disks are oriented generally horizontally, for rotation about upstanding or vertical rotational axes.

In connection with vertical spreaders, it is known to provide a manner of enabling easily choosing different operating modes or configurations for spreading all of the crop residue; windrowing all of the residue; or spreading the chaff and windrowing the straw. Reference in this regard, Wolters et al., U.S. Pat. No. 6,719,627 issued Apr. 13, 2004, which discloses a vertical spreader and rear door arrangement wherein the door can be closed and the spreader positioned in a straw and chaff spreading configuration, and wherein the door can be opened to provide straw windrowing and chaff spreading. The spreader can alternatively be positioned in a rearmost raised clean out position to allow both the straw and chaff to fall through the rear opening of the machine for windrowing.

In contrast, with horizontal spreaders, the disks are relatively large and when not in use substantially block the rear opening of the harvesting machine, necessitating removal of the spreader assembly from the machine, or removal of the spreader disks from the spreader assembly, if it is desired not to spread crop residue. Some spreaders provide quick release mechanisms for this purpose. However, as a disadvantage, the spreader assembly, or the spreader disks are both quite large, and must be stored when not in use. As another disadvantage, with at least some horizontal spreaders it is not possible to spread the chaff and windrow the straw, which is a desired operation of many combine operators.

Therefore it would be desirable to have a crop residue distribution apparatus and system utilizing a horizontal spreader, that provides a straw and chaff spreading configuration, a straw windrowing and chaff spreading configuration, and a straw and chaff windrowing configuration that does not require removal of the spreader disks.

Thus, what is sought is an apparatus or system that overcomes at least one of the problems, shortcomings or disadvantages as set forth above.

SUMMARY OF THE INVENTION

What is disclosed is an apparatus or system, which overcomes at least one of the problems, shortcomings or disadvantages as set forth above.

According to a preferred aspect of the invention, the crop residue distribution apparatus and system has a spreader assembly including side by side first and second spreader disks supported for rotation about generally upstanding rotational axes therethrough, respectively. First and second spreader drive units are connected in rotatably driving relation to the spreader disks, respectively, and extend axially upwardly therefrom, respectively, defining an aperture between the drive units, the spreader assembly being supported in or adjacent to a lower opening of a rear cavity of the harvesting machine. The apparatus and system include a pivotably supported deflector door bounding a rear end of the rear cavity, the deflector door having a lower portion configured and dimensioned to be cooperatively received in enclosing, or positioned in covering, relation to the aperture defined between the drive units. The deflector door is pivotally movable between a forward closed position wherein the lower portion is disposed in and encloses the aperture to at least substantially prevent flow of crop residue through the aperture, and an open position rearward of the forward position to allow flow of crop residue through the aperture.

According to another preferred aspect of the invention, the spreader assembly is supported for pivotable movement along a path between a forward spreading position for receiving a flow of crop residue from a cleaning system of the harvesting machine disposed forwardly of the lower opening of the rear cavity thereof, and a rear position upwardly and rearwardly of the forward spreading position.

According to another preferred aspect of the invention, the spreader assembly and the deflector door are configured and cooperate to allow pivoting of the spreader assembly to the rear position thereof with the deflector door in the forward closed position thereof.

As an attendant advantage, with the spreader assembly in the forward spreading position, and the deflector door in the forward closed position, crop residue flow rearwardly from the cleaning system and a threshing system of the machine will be received and spread by the spreader assembly when the disks thereof are rotating.

As another attendant advantage, when the spreader assembly is in the rearward position and the deflector door is in the forward closed position crop residue flow rearwardly from the cleaning system and a threshing system of the machine will be discharged through the lower opening to form a windrow behind the machine.

As still another advantage, when the spreader assembly is positioned in the forward spreading position and the deflector door is positioned in the open position, crop residue flow rearwardly from the cleaning system will be received and spread by the spreader assembly when the disks thereof are rotating, and crop residue flow from the threshing system will be mostly discharged through the aperture to form a windrow behind the machine.

According to another preferred aspect of the invention, the first and second drive units include upstanding shields which extend about at least portions of first and second drive motors of the units, respectively, and bound the aperture. As an attendant advantage, this enables these units or their shields to desirably limit the width of and shape at least a portion of the residue flow through the aperture, so as to correspondingly limit or control the width of the thus formed windrow, e.g., so as not to be driven over by a tractor when baling the windrow. To assist in this capability, the lower portion of the deflector door can be about equal in vertical extent to the upstanding shields, and can be desirably angled or positioned when the door is open, for forming the windrow shape. Still further in this regard, the deflector door can include an upper portion disposed upwardly and forwardly of the lower portion, the upper portion including flow guides adjacent opposite side edges thereof that extend generally convergingly toward the lower portion to help shape the outflowing straw forming the windrow.

According to another preferred aspect of the invention, lowermost portions of the flow guides define a sideward extent therebetween about equal to a sideward extent of the aperture between the drive units, thereby limiting and shaping the outflowing straw.

According to still another preferred aspect of the invention, the spreader assembly is supported by a frame including a generally horizontal cross bar spanning a sideward extent of a rear end of the harvesting machine and attached between first and second pivot arms mounted to and pivotably movable about first and second pivot points, respectively, on opposite sides of the harvesting machine, enabling easily and quickly moving the spreader assembly along its path of motion between the forward spreading and stored positions. The drive units can comprise upstanding drive shafts extending between the spreader disk connected to the drive unit and a drive motor of the unit, supported on the cross bar for pivotable movement with the pivot arms about the pivot points, and are least partially covered by the shields.

As additional advantages, a simple and economical means to windrow straw and spread chaff without removing the spreader disks is achieved. The disclosure also provides a means to windrow all crop material without removing the disks.

BRIEF DESCRIPTION OF THE DRAWINGS

FIG. 13 is a simplified schematic top view of the harvesting machine of FIG. 1 illustrating the straw and chaff deposited over a swath of a field when the machine is in the straw and chaff windrowing configuration.

DETAILED DESCRIPTION OF THE INVENTION

Figure 1:
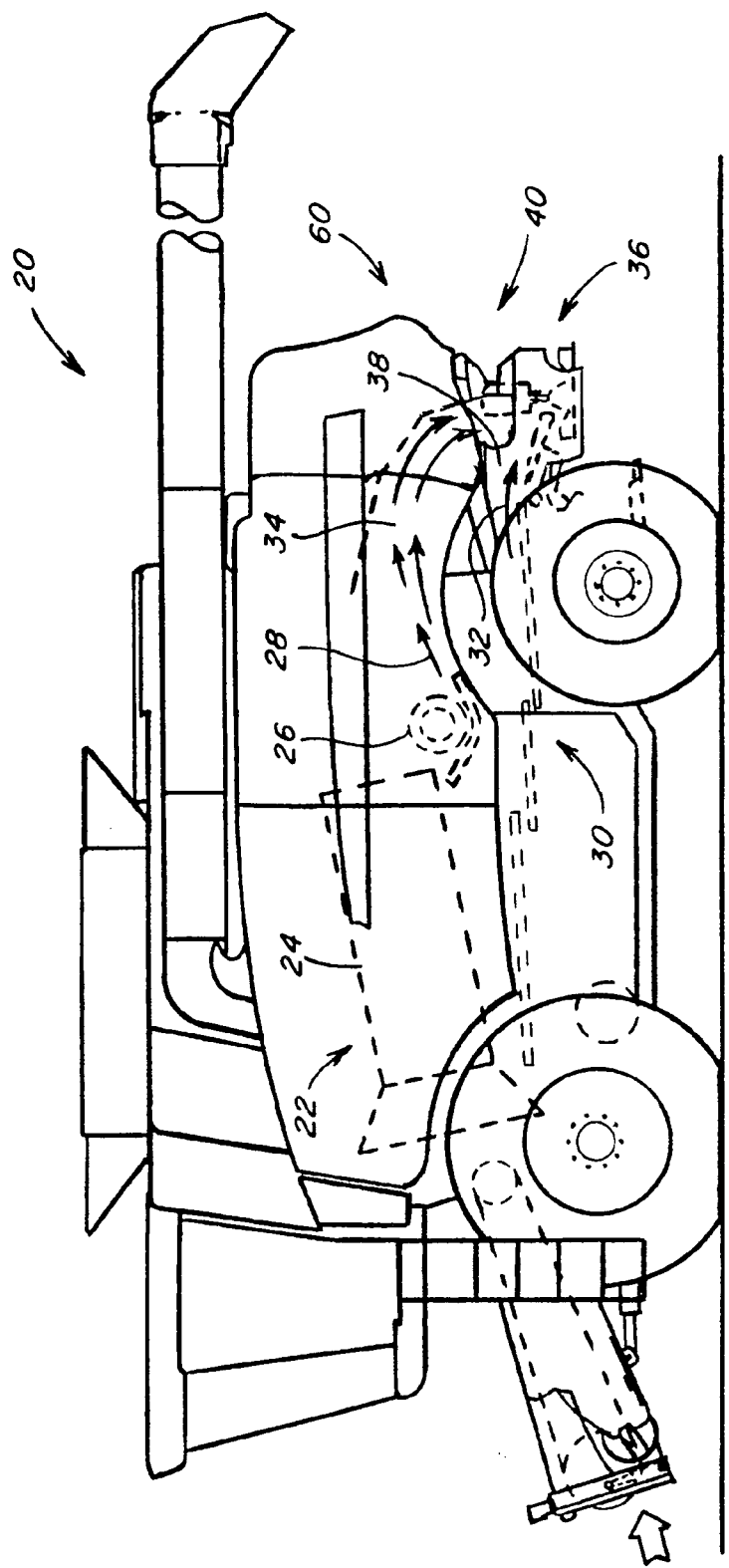
FIG. 1 is a simplified side view of an agricultural harvesting machine including a crop residue distribution apparatus and system of the present invention.

Referring now to FIG. 1 of the drawings, an agricultural combine 20 representative of a wide variety of agricultural harvesting machines is shown. Combine 20 is constructed and operable in the well known manner and includes a threshing system 22 including a rotor 24 rotatable for separating straw stalks and other plant residue, generally referred to as straw 28 or straw residue, from the harvested crop, and a beater 26 rotatable for propelling or directing a flow or stream of straw 28 rearwardly along an airborne trajectory through a rear cavity 34 enclosed by structural sheets of combine 20, as is also well known in the art. Combine 20 also includes a cleaning system 30 for receiving the harvested crop from threshing system 22 and removing chaff and any other remaining additional residue including seed pods and husks and the like, generally referred to as chaff 32 or chaff residue, from the grain and directing a flow or stream of chaff 32 rearwardly through a lower region of rear cavity 34, towards a lower opening 38 in which a horizontal residue spreader assembly 36, is shown located, and which comprises part of a crop residue distribution apparatus and system 40 constructed and operable according to the present invention.

Referring also to FIGS. 2 through 13 of the drawings, horizontal spreader assembly 36 of apparatus and system 40 includes side by side first and second spreader disks 42, 44 supported for counter rotation, as denoted by arrows R, about generally upstanding rotational axes 46, 48 therethrough, respectively. Here, spreader disks 42, 44 are supported and rotatably driven by upstanding first and second spreader drive units 50, 52, respectively, which extend axially upwardly from the disks and are sidewardly spaced apart so as to define and bound the sides of an aperture 54 therebetween. As seen in FIGS. 2 through 9, spreader assembly 36 is supported rearwardly of and adjacent to a chaff transfer pan 56 positioned for carrying some of the chaff that falls from the rearward flow, toward spreader disks 42, 44.

According to a preferred aspect of the invention, spreader assembly 36 is supported for pivotable movement about an axis 68 along a path between a forward spreading position, depicted in FIGS. 2 through 9, for receiving at least the flow of chaff 32 from cleaning system 30, and also the flow of straw 28 in some configurations, as will be explained, and a rear position, depicted in FIGS. 10 through 13, upwardly and rearwardly of the forward spreading position, also referred to as a storage position.

Crop residue distribution apparatus and system 40 also preferably includes a pivotably supported deflector door 62 bounding a rear end 60 of the rear cavity 34. Deflector door 62 has a lower portion 66 configured and dimensioned to be cooperatively received in enclosing relation to aperture 54 defined between drive units 50, 52 of spreader assembly 36. Deflector door 62 is pivotable about an axis 64 between a forward closed position (FIGS. 2 through 5, and 10 through 13) and an open position rearward of the forward position (FIGS. 6 through 9).

According to the preferred embodiment of the invention, spreader assembly 36 and deflector door 62 are configured to cooperate to allow pivoting of spreader assembly 36 to the rear or storage position thereof with deflector door 62 in the forward closed position thereof. Also deflector door 62 is pivotable to the open position thereof with spreader assembly 36 in the forward spreading position thereof. Accordingly, crop residue distribution apparatus and system 40 is configurable to perform each of the above mentioned desired crop operations, namely (1) straw 28 and chaff 32 spreading; (2) straw 28 windrowing and chaff 32 spreading; and (3) straw 28 and chaff 32 windrowing, as explained next.

1. Spreading All Crop Material—Deflector Door in the "Down" Position

This configuration is illustrated by FIGS. 2 through 5 of the drawings. In this position the door is "down" or closed to direct all crop material or residue onto the spreader disks 42, 44 for discharge onto the field. The spreader disks 42, 44 will accept crop from two streams or flows, an upper stream (straw 28) from the threshing rotor 24 and chopper (not shown), and a lower stream (chaff 32) from the cleaning system 30. The disks will spread these two streams together.

When spreader assembly 36 is positioned in the forward spreading position thereof and deflector door 62 is positioned in the forward closed position thereof, lower portion 66 is disposed in, which also means in front of, aperture 54 to close or block it to prevent flow of crop residue therethrough. As a result, substantially all the straw 28 flowing rearwardly from threshing system 22 is deflected downwardly into and with the chaff 32 flowing rearwardly from cleaning system 30, so as to be directed towards and through lower opening 38, to be received and spread by spreader disks 42, 44 of spreader assembly 36, as depicted in FIGS. 2 through 5.

Figure 4:
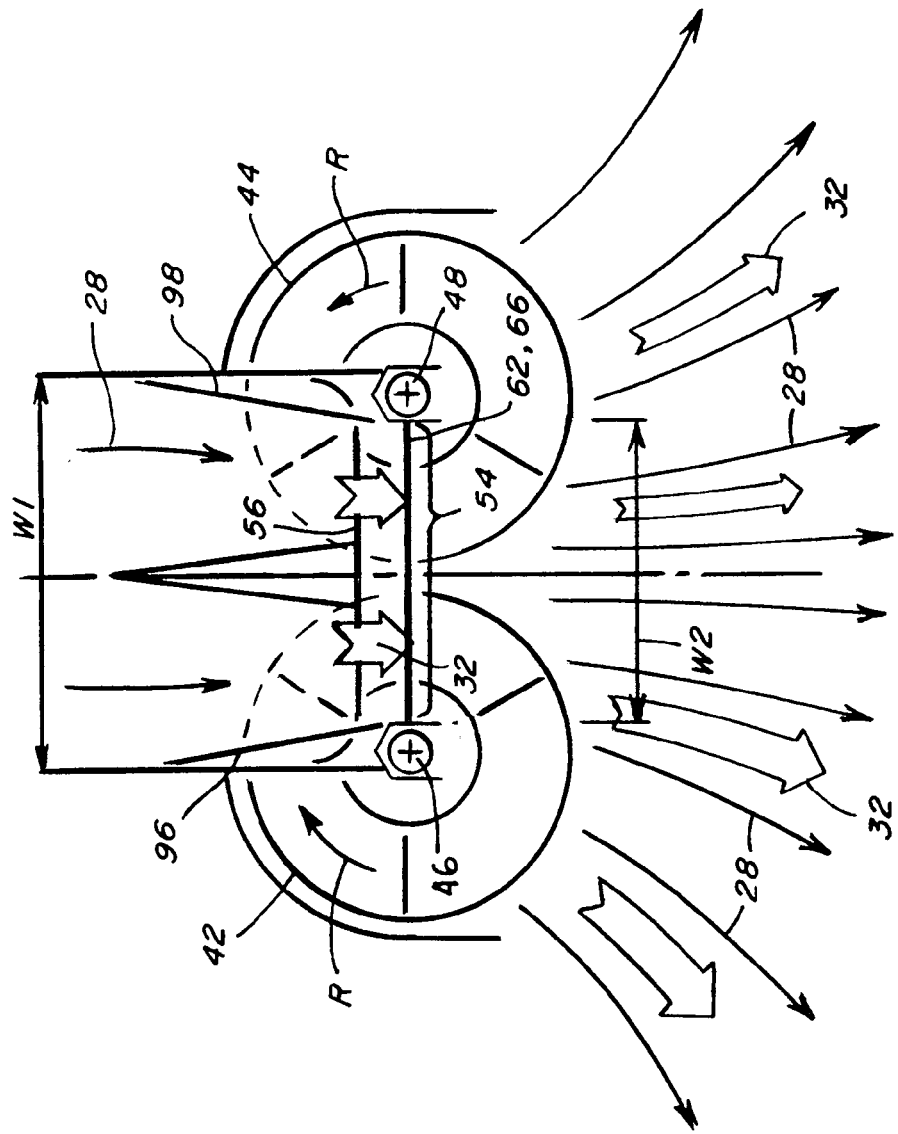
FIG. 4 is a simplified fragmentary top view of the harvesting machine and distribution apparatus and system of FIG. 1 illustrating straw flow and chaff flow when the apparatus and system is in the straw and chaff spreading configuration.
Figure 5:
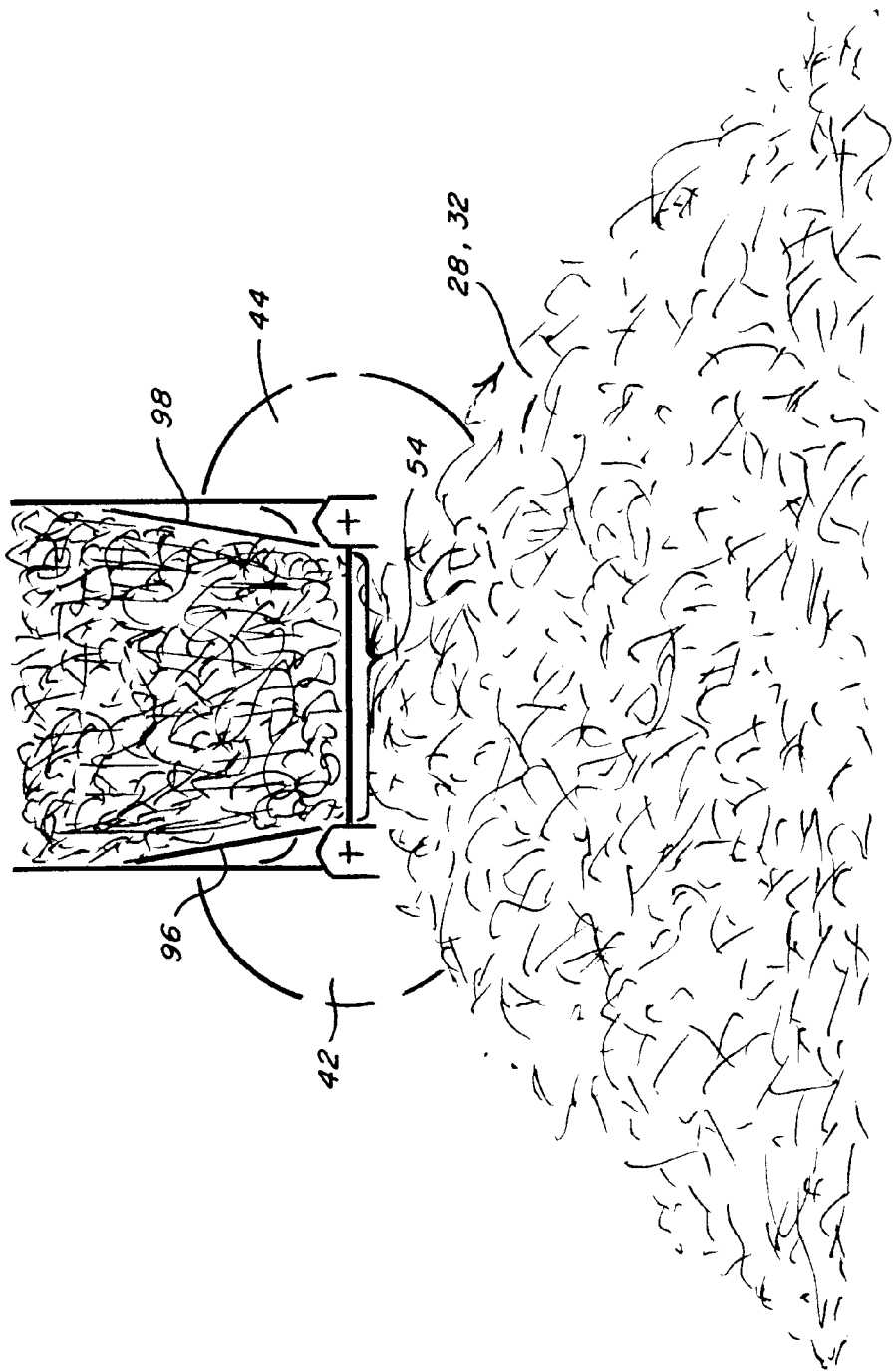
FIG. 5 is a simplified schematic top view of the harvesting machine and distribution apparatus and system of FIG. 1 illustrating the straw and chaff deposited over a swath of a field when the system is in the straw and chaff spreading configuration.
Figure 6:
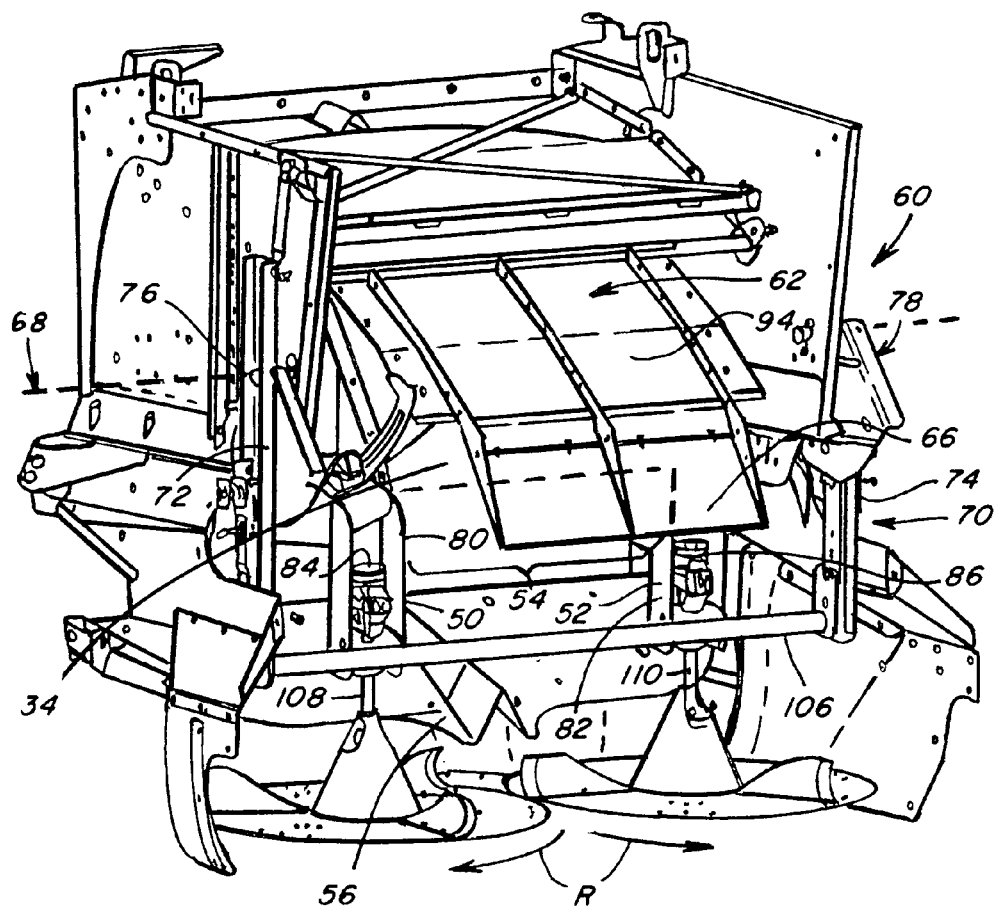
FIG. 6 is fragmentary perspective rear view of the harvesting machine of FIG. 1 showing the distribution apparatus and system in a straw windrowing and chaff spreading configuration.
Figure 7:
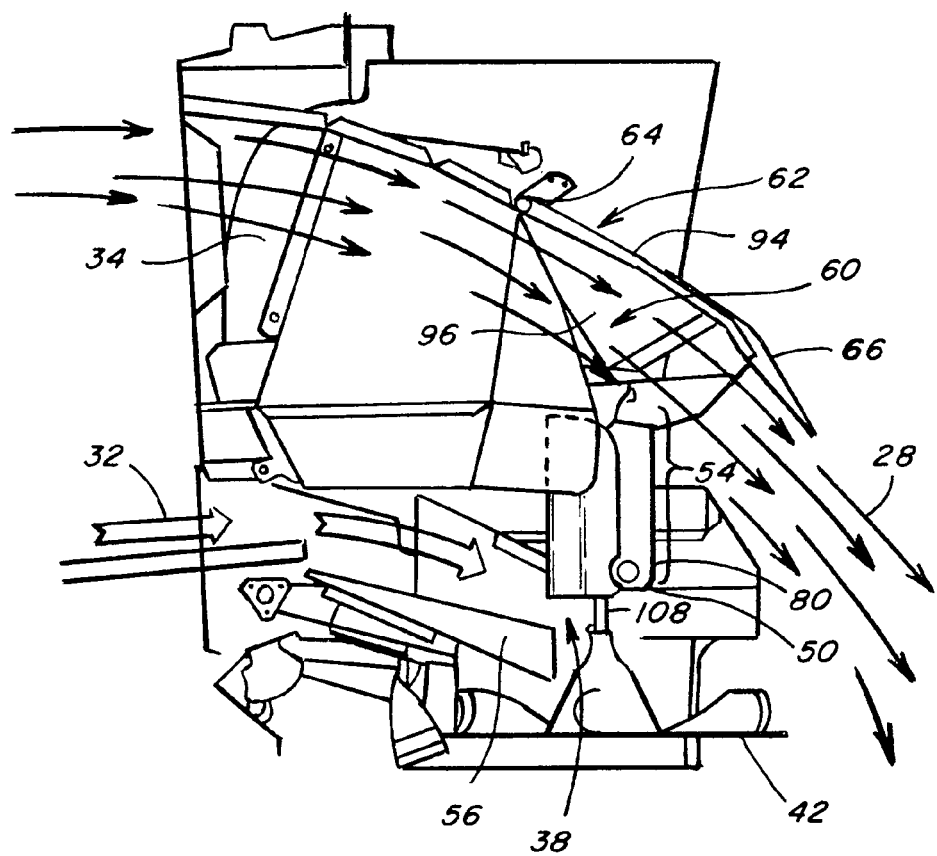
FIG. 7 is a fragmentary perspective side view of the harvesting machine of FIG. 1 showing the distribution apparatus and system in the straw windrowing and chaff spreading configuration.
Figure 8:
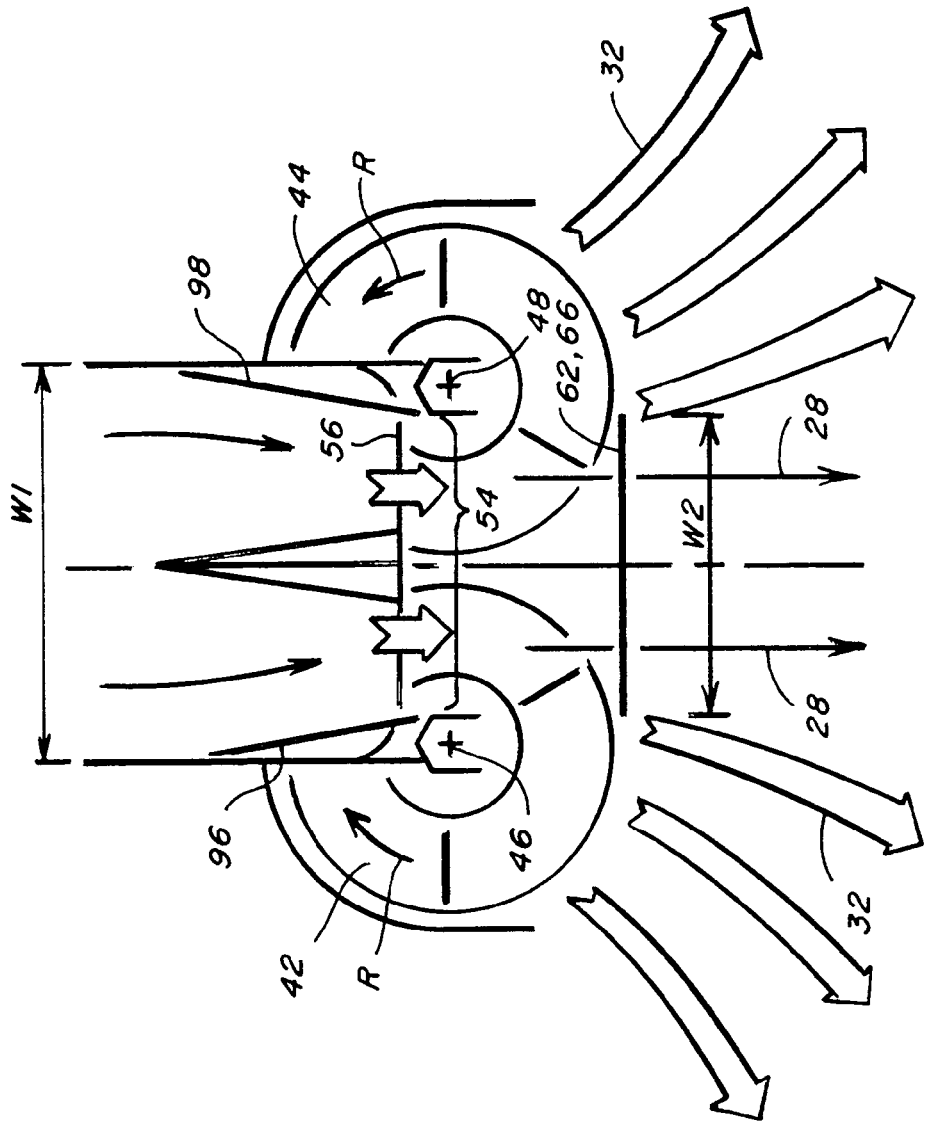
FIG. 8 is a simplified fragmentary top view of the harvesting machine and distribution apparatus and system of FIG. 1 illustrating straw flow and chaff flow when the machine is in the straw windrowing and chaff spreading configuration.

It can be observed in FIG. 4 that rear cavity 34 has a general width denoted W1. According to a preferred feature of the invention, first and second drive units 50, 52 include upstanding shields 80, 82 which extend about at least forward and side portions of first and second drive motors 84, 86 of units 50, 52, respectively, and bound aperture 54, defining the width W2 that is significantly smaller than width W1 which is advantageous for the next configuration as explained below.

Figure 2:
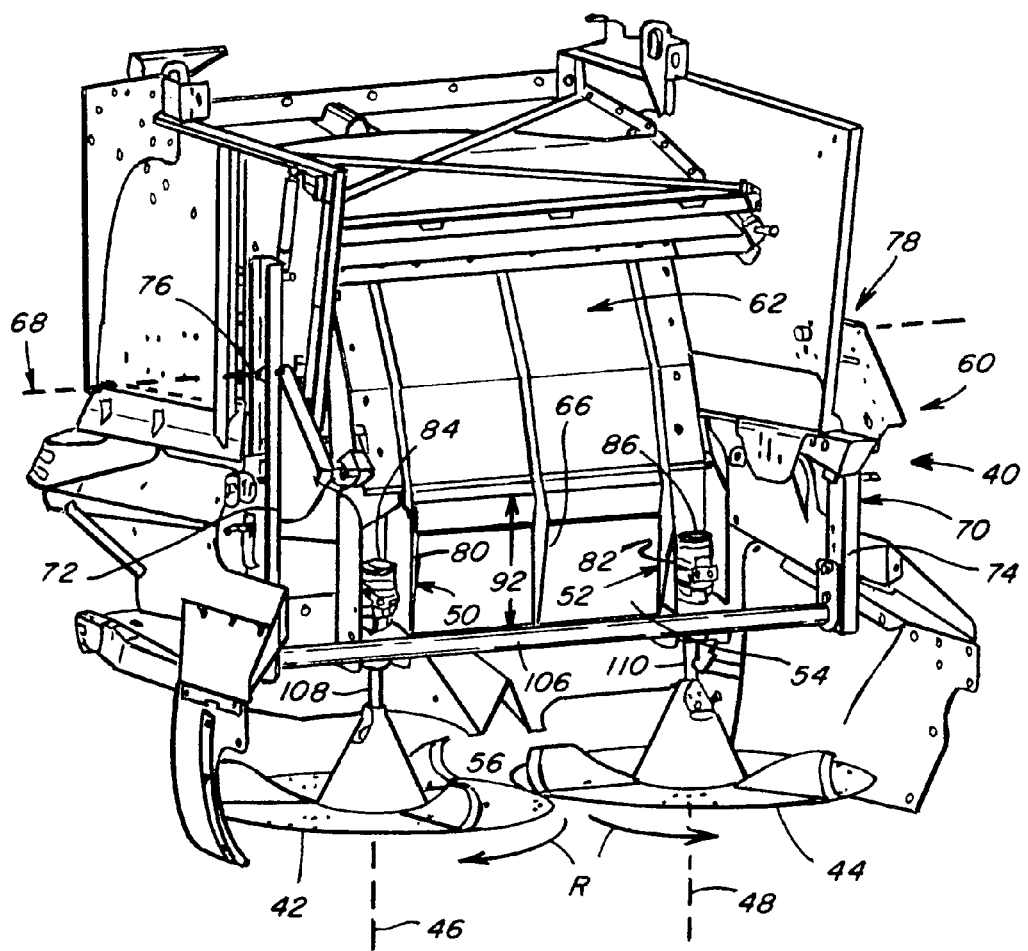
FIG. 2 is a fragmentary perspective rear view of the harvesting machine of FIG. 1 showing the distribution apparatus and system in a straw and chaff spreading configuration.
Figure 3:
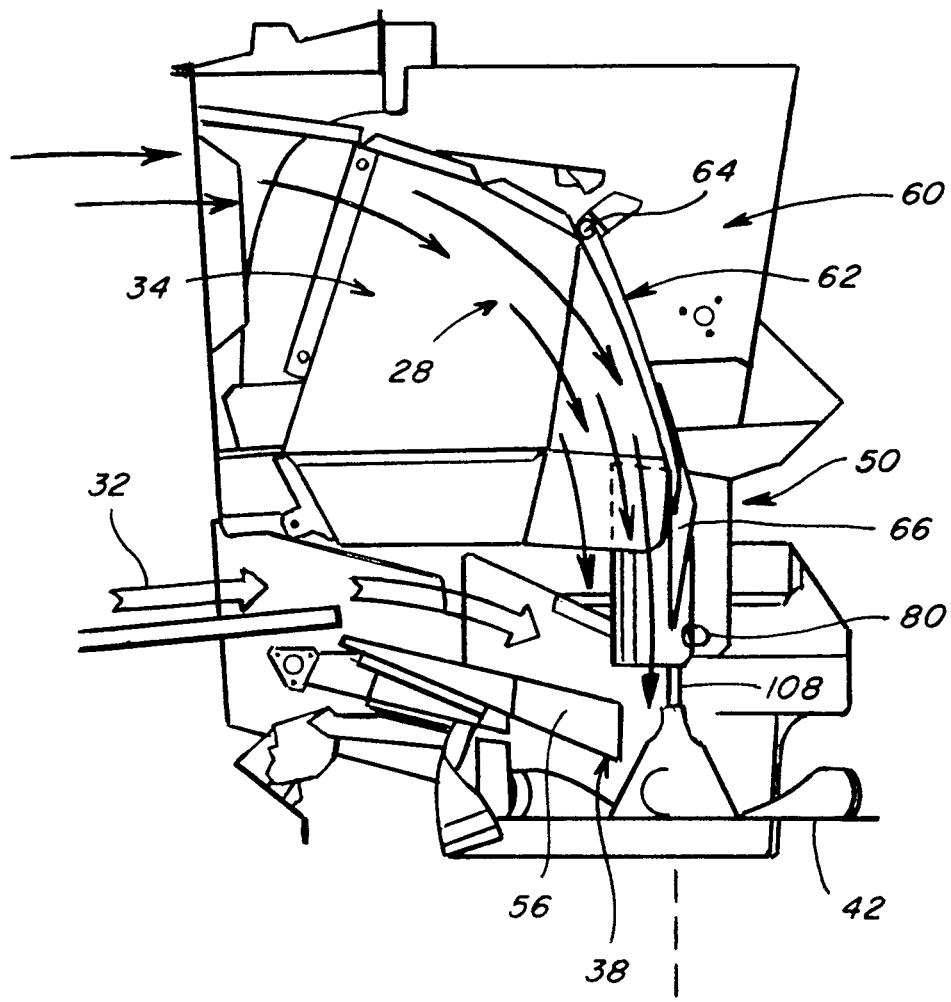
FIG. 3 is a fragmentary perspective side view of the harvesting machine of FIG. 1 showing the distribution apparatus and system in the straw and chaff spreading configuration.

According to another preferred feature of the invention, lower portion 66 of the deflector door 62 is about equal in vertical extent 92 to that of upstanding shields 80, 82, and thus aperture 54, as seen in FIG. 2, so that the aperture is desirably or effectively blocked or closed in this configuration.

Advantageously, because lower portion 66 of deflector door 62 encloses the aperture defined between drive units 50, 52, essentially all of the flow of straw residue 28 is directed forwardly and more centrally on spreader disks 42, 44 for improved spreader operation. In addition, the disposition of lower portion 66 of deflector door 62 helps prevent flow of straw 28 or chaff 32 from discharging rearwardly or sidewardly from aperture 54 and thereby interfering with the desired discharge pattern of spreader disks 42, 44.

2. Spreading Chaff, Windrowing Straw—Deflector Door in the "Up" Position

This configuration is illustrated by FIGS. 6 through 9 of the drawings. The deflector door 62 may be "opened" to allow the upper stream of crop (straw 28) to be diverted over the top of the spreader disks 42, 44 such that this crop stream (straw 28) is not spread. The disks 42, 44 continue to receive the second stream (chaff 32) from the cleaning system for spreading onto the field. The first stream (straw 28) is deposited into a windrow directly behind the combine for baling or other operation.

When spreader assembly 36 is positioned in the forward spreading position thereof and deflector door 62 is positioned in the open position thereof, at least a substantial portion of the straw 28 flowing rearwardly from threshing system 22 desirably discharges through aperture 54 to form a windrow behind combine 20, and substantially all of the chaff 32 flowing rearwardly from cleaning system 30 is desirably discharged through lower opening 38 and received and spread by spreading disks 42, 44 of spreader assembly 36, as depicted in FIGS. 6 through 9.

Figure 9:
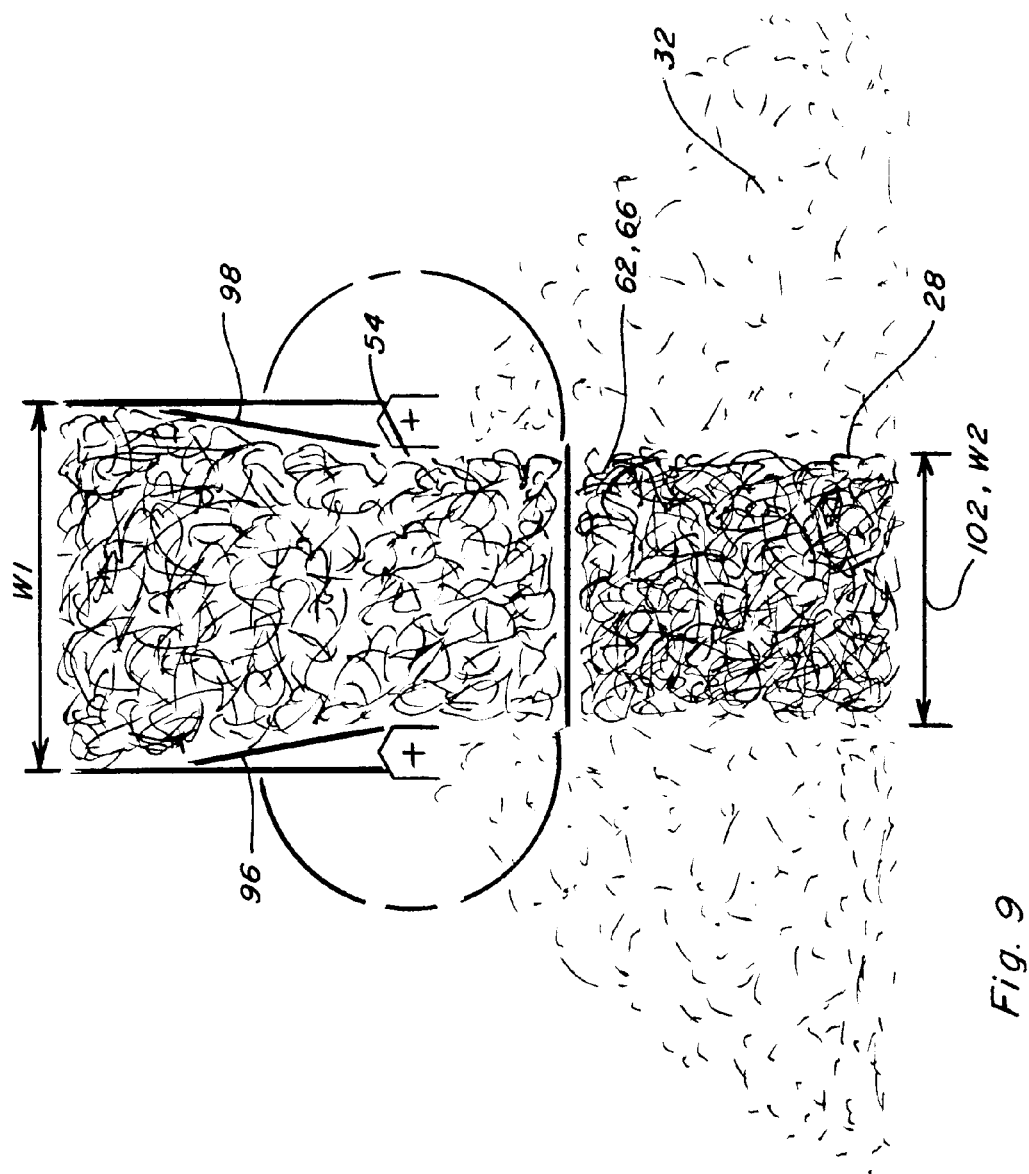
FIG. 9 is a simplified schematic top view of the harvesting machine and distribution apparatus and system of FIG. 1 illustrating the straw and chaff deposited over a swath of a field when the machine is in the straw windrowing and chaff spreading configuration.
Figure 10:
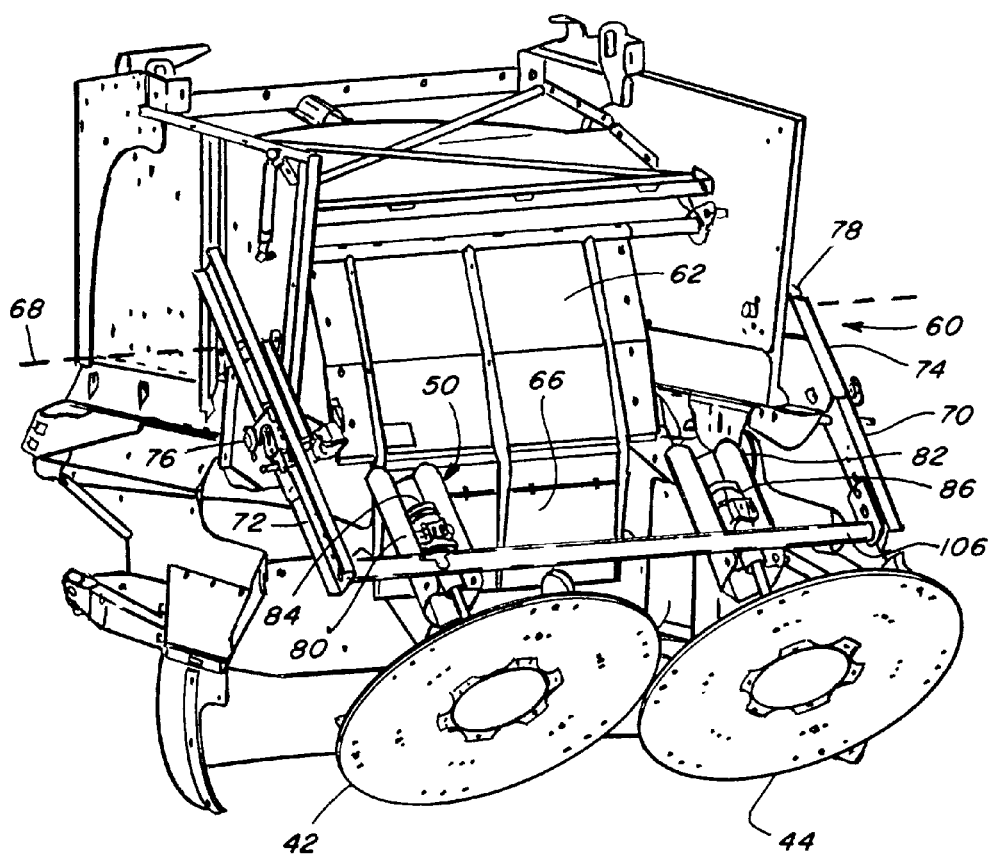
FIG. 10 is fragmentary perspective rear view of the harvesting machine of FIG. 1 showing the machine in a straw and chaff windrowing configuration.
Figure 11:
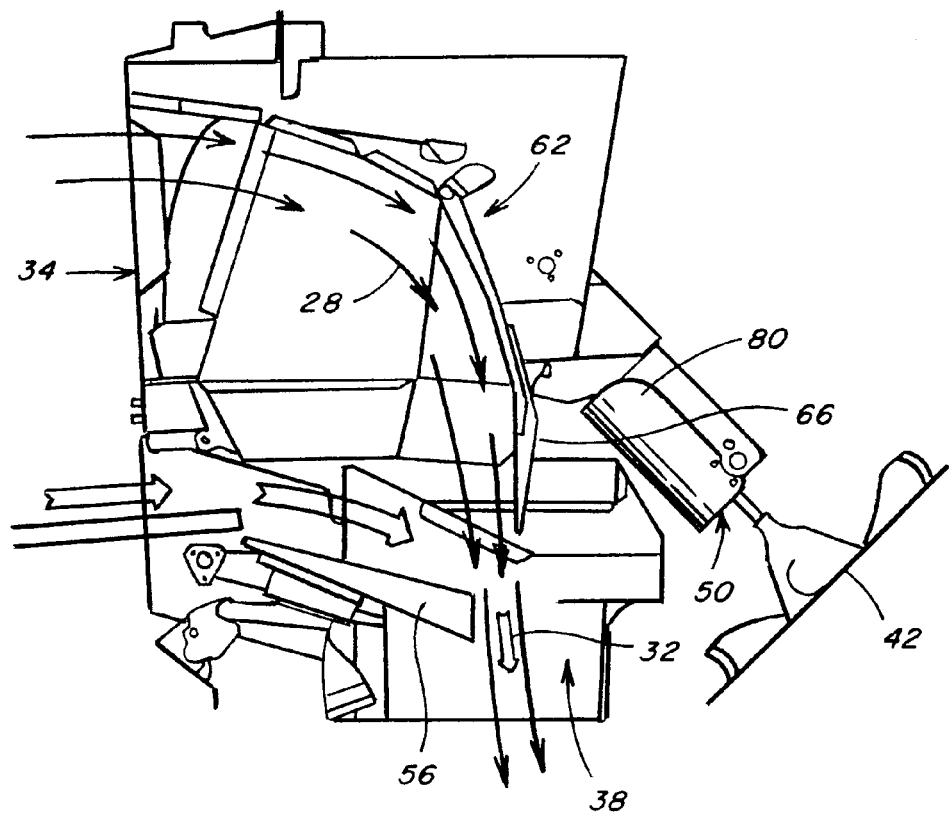
FIG. 11 is fragmentary perspective side view of the harvesting machine and distribution apparatus and system of FIG. 1 showing the machine in the straw and chaff windrowing configuration.
Figure 12:
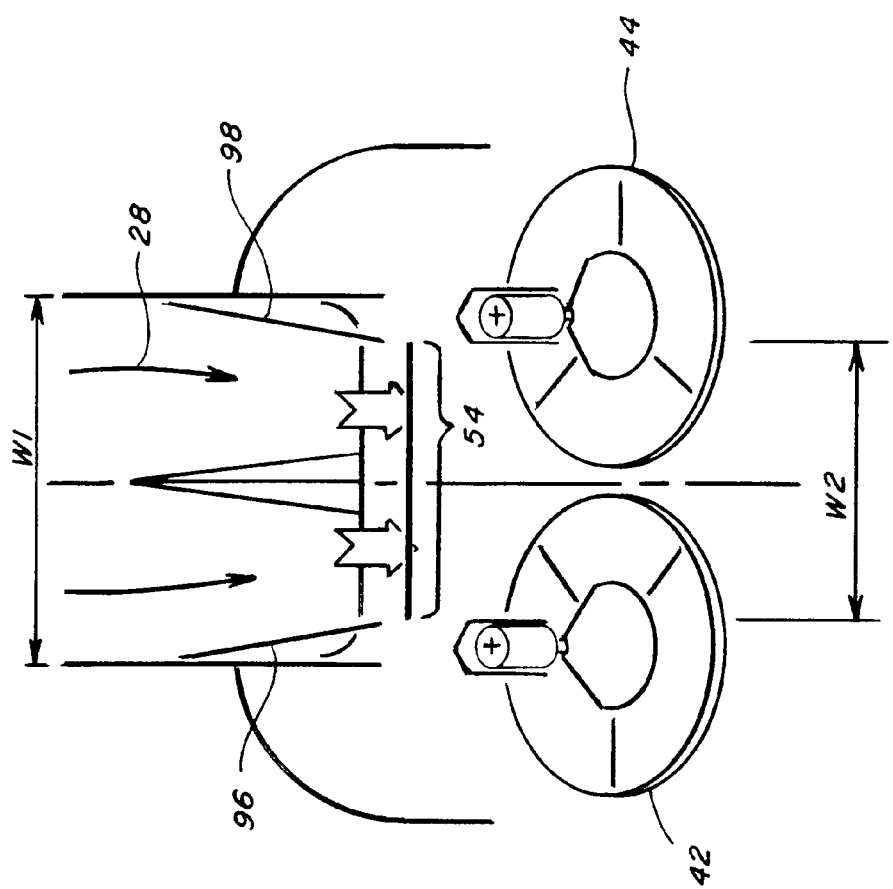
FIG. 12 is a simplified fragmentary top view of the harvesting machine and distribution apparatus and system of FIG. 1 illustrating straw flow and chaff flow when the machine is in the straw and chaff windrowing configuration.

Deflector door 62 includes an upper portion 94 disposed upwardly and forwardly of lower portion 66 which includes flow guides 96, 98 adjacent opposite side edges thereof. Flow guides 96, 98 extend generally convergingly toward lower portion 66 to gradually narrow a sideward extent of the straw flow from a maximum width W1, as the flow passes through the rear end of cavity 34 so as to have a narrowed width W2 (FIGS. 8) to thus produce a windrow behind combine 20 of a desired correspondingly narrowed sideward extent or width 102 (FIG. 9). In particular, the lowermost portions of flow guides 96, 96 define a sideward extent W2 of a lowermost opening or gap therebetween about equal to a sideward extent W2 of aperture 54 between drive units 50, 52 and thus those limits together will cooperate to impart a desired sideward extent 102 to the windrow. These elements advantageously define and bound a rearmost opening (including aperture 54) which is shaped and configured to impart a desired shape and size both width-wise and height-wise to the outward flow of the straw, such that a thus formed windrow can be desirably limited in width and have a desired shape or height. In this regard it should be understood that the exact position and orientation of door 62 and/or lower portion 66 when the door is in the open position are contemplated to be variable or changeable as desired or required for imparting desired characteristics to a thus formed windrow.

Advantageously, it is evidenced that the operator is now provided a convenient and easy to configure capability to windrow straw 28 and spread chaff 32 using a horizontal spreader arrangement which allows the straw 28 to be baled or further processed, while gaining the benefits associated with spreading chaff 32 over the field in a normal desired manner, such as reducing soil erosion and later providing more uniform soil temperature and moisture distribution for planting, and the like.

3. Windrowing All Crop Material—Deflector Door in the "Down" Position, Spreader Disks Pivoted to Storage Position This configuration is illustrated by FIGS. 10 through 13 of the drawings. Here, it can be understood that the disks 42, 44 may be supported by any of a variety of structures, such as but not limited to, a frame work spanning the vehicle, connected to pivot arms pivotably mounted to a fixed pivot on combine 20, as shown. The disk assembly 36 thus may be rotated in a rearward direction for storage or non-use. In this position the disks can advantageously be near a proximity sensor or in contact with another sensor or device such as an interlock or interrupt valve or switch (not shown) that can de-power drive motors 84 and 86, e.g., interrupt or disable hydraulic oil flow to fluid powered drive motors, thus stopping their operation. The two crop streams (straw 28 and chaff 32) will both be deposited into a windrow directly behind the combine 20 for subsequent operations, e.g., baling, pick up for silage or biomass.

In particular, when spreader assembly 36 is positioned in the rear or storage position thereof and deflector door 62 is positioned in the forward closed position thereof, lower opening 38 is now unobstructed and desirably substantially all of the straw 28 flowing rearwardly from threshing system 22 is deflected downwardly by deflector door 62 for discharge with substantially all of the chaff 32 flowing rearwardly from cleaning system 30 through lower opening 38 of combine 20 to form a windrow, as depicted in FIGS. 10 through 13.

To achieve this capability, in a preferred configuration spreader assembly 36 is supported by a frame 70 including a generally horizontal cross bar 106 spanning a sideward extent of rear end 60 of combine 20 and attached between first and second pivot arms 72, 74 mounted to and pivotably movable about first and second pivot points 76, 78, respectively, on opposite sides of combine 20 along axis 68.

Here, it should be noted that it is contemplated that as a preferred configuration, each of drive units 42, 44 comprises an upstanding, elongate drive shaft 108, 110 extending between spreader disk 42, 44 connected to drive unit 50, 52 and drive motor 84, 86 of unit 42, 44, supported on cross bar 106 for pivotable movement with pivot arms 72, 74 about the pivot points 76, 78, although other suitable constructions can be used.

It should also be noted that drive shaft 108, 110 and drive motor 84, 86 of each of drive units 42, 44 is at least partially covered by upstanding shield 80, 82 bounding a side of aperture 54, which provides advantages include the ability to better guide and shape the rearward convergence of at least some of the straw flow forming a windrow, including to limit the width of the outward flow for controlling the width 102 of a thus formed windrow, e.g. to avoid being driven over by a tractor pulling a baler.

Suitable spreader drive motors 84, 86 or elements can include, but are not limited to, conventionally constructed and operable hydraulic motors powered by pressurized hydraulic fluid received from a pump; electric motors; belt drives, chain drives, or the like.

In light of all the foregoing, it should thus be apparent to those skilled in the art that there has been shown and described a crop residue distribution apparatus and system that provides the advantages sought therefor. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A crop residue distribution apparatus for an agricultural harvesting machine, comprising:

a spreader assembly including side by side first and second spreader disks supported for rotation about generally upstanding rotational axes therethrough, respectively, and first and second spreader drive units connected in rotatably driving relation to the spreader disks, respectively, and extending axially upwardly therefrom, respectively, defining an aperture between the drive units, the spreader assembly being supported in or adjacent to a lower opening of a rear cavity of the harvesting machine, said spreader assembly being supported for pivotable movement along a path between a forward spreading position for receiving a flow of crop residue from a cleaning system of the harvesting machine disposed forwardly of the lower opening of the rear cavity thereof, and a rear position upwardly and rearwardly of the forward spreading position; and a pivotably supported deflector door bounding a rear end of the rear cavity, the deflector door having a lower portion configured and dimensioned to be cooperatively received in enclosing relation to the aperture defined between the drive units, the deflector door being pivotally movable between a forward closed position wherein the lower portion is disposed in and encloses the aperture to at least substantially prevent flow of crop residue through the aperture, and an open position rearward of the forward position to allow flow of crop residue through the aperture.

2. The crop residue distribution apparatus of claim 1 wherein the spreader assembly and the deflector door are configured and cooperate to allow pivoting of the spreader assembly to the rear position thereof with the deflector door in the forward closed position thereof.

3. The crop residue distribution apparatus of claim 1 wherein the first and second drive units include upstanding shields which extend about at least portions of first and second drive motors of the units, respectively, and bound the aperture.

4. The crop residue distribution apparatus of claim 3 wherein the lower portion of the deflector door is about equal in vertical extent to the upstanding shields.

5. The crop residue distribution apparatus of claim 1 wherein the deflector door includes an upper portion disposed upwardly and forwardly of the lower portion, the upper portion including flow guides adjacent opposite side edges thereof that extend generally convergingly toward the lower portion.

6. The crop residue distribution apparatus of claim 5 wherein lowermost portions of the flow guides define a sideward extent therebetween about equal to a sideward extent of the aperture between the drive units.

7. The crop residue distribution apparatus of claim 1 wherein the spreader assembly is supported by a frame including a generally horizontal cross bar spanning a sideward extent of a rear end of the harvesting machine and attached between first and second pivot arms mounted to and pivotably movable about rust and second pivot points, respectively, on opposite sides of the harvesting machine.

8. The crop residue distribution apparatus of claim 7 wherein each of the drive units comprises an upstanding drive shaft extending between the spreader disk connected to the drive Unit and a drive motor of the unit, supported on the cross bar for pivotable movement with the pivot arms about the pivot points.

9. The crop residue distribution apparatus of claim 8 wherein the drive shaft and the drive motor of each of the drive units is at least partially covered by an upstanding shield bounding a side of the aperture.

10. A crop residue distribution system for an agricultural harvesting machine, comprising:
a spreader assembly including side by side first and second spreader disks supported for rotation about generally upstanding rotational axes therethrough, respectively, and first and second spreader drive units connected in rotatably driving relation to the spreader disks, respectively, and extending axially upwardly therefrom, defining an aperture between the drive units, the spreader assembly being supported in or adjacent to a lower opening of a rear cavity of the harvesting machine for pivotable movement about a generally horizontal, sidewaxdly extending pivotal axis, along a path between a forward spreading position for receiving a flow of crop residue from a cleaning system of the harvesting machine disposed forwardly of the lower opening, and a rear position upwardly and rearwardly of the forward spreading position; and
a deflector door mounted for pivotal movement about a generally horizontal, sidewardly extending axis, bounding a rear end of the rear cavity, the deflector door having a lower portion configured and dimensioned to be cooperatively received in enclosing relation to the aperture defined by the drive units, the deflector door being pivotally movable between a forward closed position wherein the lower portion is disposed in and encloses the aperture when the spreader assembly is in the forward spreading position to prevent flow of crop residue through the aperture, and an open position rearward of the forward position to allow flow of crop residue through the aperture.

11. The crop residue distribution system of claim 10, wherein the spreader assembly and the deflector door are configured and cooperate to allow pivoting of the spreader assembly to the rear position thereof with the deflector door in the forward closed position thereof.

12. The crop residue distribution apparatus of claim 10 wherein the first and second drive units include upstanding shields which extend about at least portions of first and second drive motors of the units, respectively, bounding sides of the aperture.

13. The crop residue distribution apparatus of claim 12 wherein the lower portion of the deflector door is about equal in vertically extent to the upstanding shields.

14. The crop residue distribution apparatus of claim 10 wherein the deflector door includes an upper portion disposed upwardly and forwardly of the lower portion, the upper portion including flow guides adjacent opposite side edges thereof that extend generally convergingly toward the lower portion.

15. The crop residue distribution apparatus of claim 14 wherein lowermost portions of the flow guides define a space therebetween having a sideward extent about equal to a sideward extent of the aperture between the drive units.

16. The crop residue distribution apparatus of claim 10 wherein the spreader assembly is supported by a frame including a generally horizontal cross bar spanning a sideward extent of a rear end of the harvesting machine and attached between first and second pivot arms mounted to and pivotably movable about first and second pivot points, respectively, on opposite sides of the harvesting machine.

17. The crop residue distribution apparatus of claim 16 wherein the drive shaft and the drive motor of each of the drive units is at least partially covered by an upstanding shield bounding a side of the aperture.

18. A crop residue distribution system for an agricultural harvesting machine, comprising:
a spreader assembly including side by side first and second spreader disks supported for rotation about generally upstanding rotational axes therethrough, respectively, and first and second spreader drive units connected in rotatably driving relation to the spreader disks, respectively, and extending axially upwardly therefrom, defining an aperture between the drive units, the spreader assembly being supported in or adjacent to a lower opening of a rear cavity of the harvesting machine for pivotable movement about a generally horizontal, sidewardly extending pivotal axis, along a path between a forward spreading position adjacent to a cleaning system of the harvesting machine disposed forwardly of the lower opening, and a rear position upwardly and rearwardly of the forward spreading position; and
a deflector door mounted for pivotal movement about a generally horizontal, sidewardly extending axis, bounding a rear end of the rear cavity, the deflector door having a lower portion configured and dimensioned to be cooperatively received in enclosing relation to the aperture between the drive units, the deflector door being pivotally movable between a forward closed position wherein the lower portion is disposed in and encloses the aperture, and an open position rearward of the forward closed position,
wherein when the spreader assembly is positioned in the forward spreading position and the deflector door is positioned in the forward closed position, crop residue flow rearwardly from the cleaning system and a threshing system of the machine will be received and spread by the spreader assembly when the disks thereof are rotating;

wherein when the spreader assembly is in the rearward position and the deflector door is in the forward closed position crop residue flow rearwardly from the cleaning system and a threshing system of the machine will be discharged through the lower opening to form a windrow behind the machine; and wherein when the spreader assembly is positioned in the forward spreading position and the deflector door is positioned in the open position, crop residue flow rearwardly from the cleaning system will be received and spread by the spreader assembly when the disks thereof are rotating, and crop residue flow from the threshing system will be mostly discharged through the aperture to form a windrow behind the machine.

19. The crop residue distribution system of claim 18 wherein the first and second spreader drive units and the deflector door include elements configured to shape and control a width of the crop residue flow through the aperture.

* * * * *